Aug. 11, 1970   A. J. TUCKER   3,523,991
METHOD OF INJECTION MOLDING A ROLLER POST
Original Filed Feb. 28, 1966   3 Sheets-Sheet 1
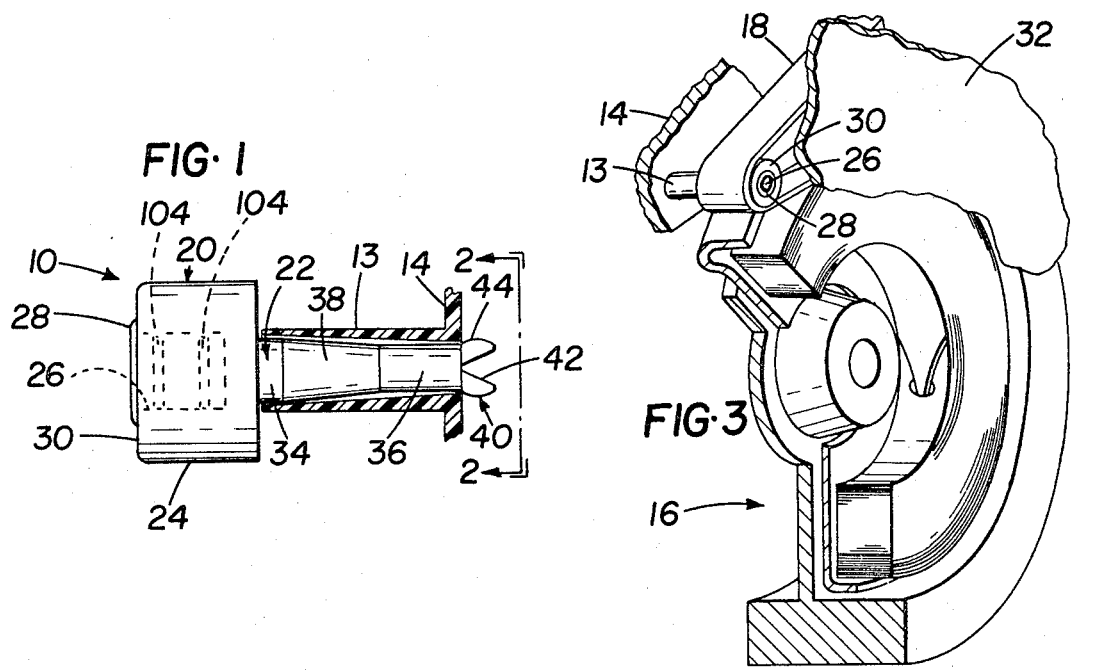
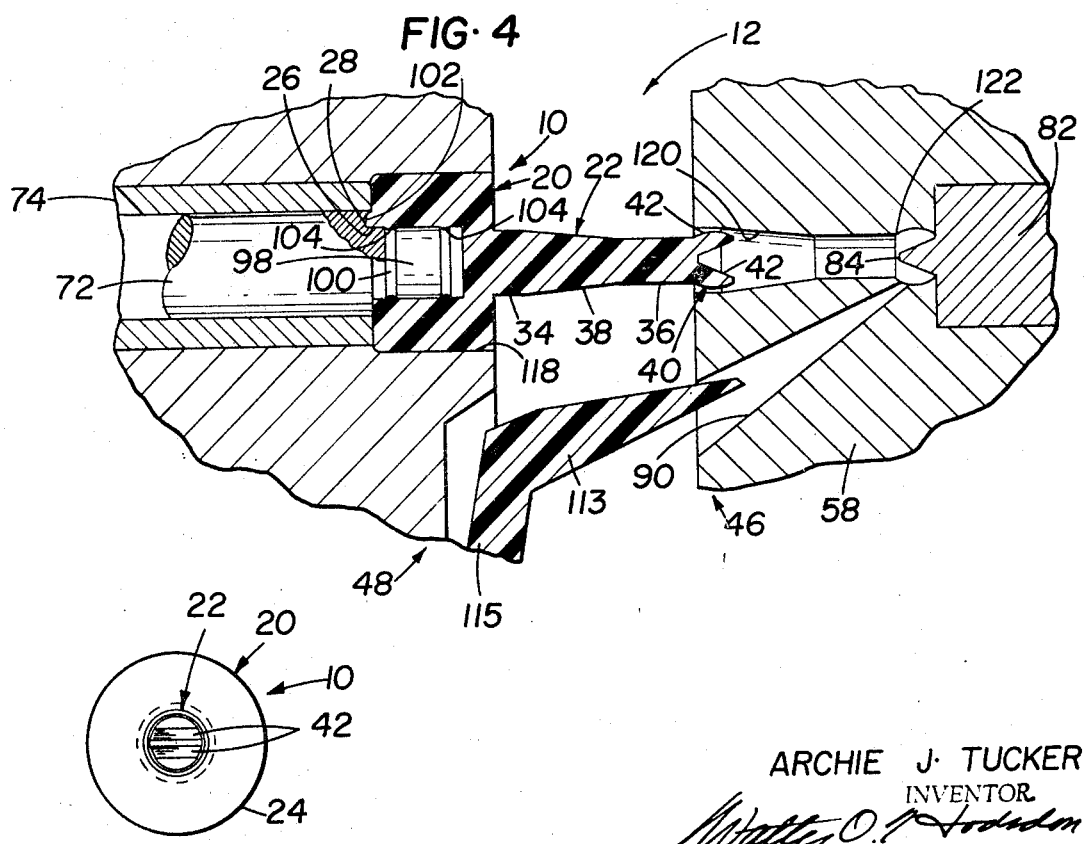
ARCHIE J. TUCKER
INVENTOR.
BY
ATTORNEYS

ARCHIE J. TUCKER
INVENTOR.

BY
ATTORNEYS

ARCHIE J. TUCKER
INVENTOR.

United States Patent Office 3,523,991
Patented Aug. 11, 1970

3,523,991
METHOD OF INJECTION MOLDING A ROLLER POST
Archie J. Tucker, Rochester, N.Y., assignor to Eastman Kodak Company, Rochester, N.Y., a corporation of New Jersey
Original application Feb. 28, 1966, Ser. No. 530,598, now Patent No. 3,451,732, dated June 24, 1969. Divided and this application July 16, 1968, Ser. No. 745,314
Int. Cl. B29d *3/00;* B29f *1/14*
U.S. Cl. 264—163                                    4 Claims

ABSTRACT OF THE DISCLOSURE

A method of injection molding a roller post consisting of a stem having a roller head on one end of the stem and a snap-in element on the other end of the stem which has a diameter larger than that of the stem so that when the part is ejected from the mold there is no sprue, runner, or tunnel gate which must be broken away from the article but all surfaces of the article come out of the mold smooth. This is accomplished by molding the roller post in such a manner that the tunnel gate, through which the thermoplastic composition passes into the mold cavity, only goes to that portion of the cavity forming the snap-in element and it is wiped smooth when the roller post is ejected from the mold.

---

This application is a division of my pending U.S. application Ser. No. 530,598, entitled, "Molded Roller Post" filed Feb. 28, 1966, now Pat. No. 3,451,732 granted on June 24, 1969.

This invention relates to injection molding a particular article, and specifically to the method of injection molding a roller post.

The roller post which is to be injection molded according to the present invention is intended to freely rotate in a bearing aperture passing through a wall structure such as a film or tape cartridge. The roller post comprises a stem having a roller head on one end and a compressible snap-in element on the other end which has a diameter greater than that of the stem. The post is assembled on the wall by inserting the stem, snap-in element first, through a bearing aperture in the wall until the snap-in element passes completely through the aperture and then expands to retain the post against being axially withdrawn from the aperture. Since the stem provides the bearing surface for the post, its surface must be smooth. The same is true of the undersurface of the roller head and the inner portion of the snap-in element which can engage the wall structure when serving to axially position the post in the bearing aperture.

The roller post guides and is rotatably engaged by a flexible strip material as it passes around the roller head portion of the post, and snubs any undesired erratic motion that may be transmitted along the length of the strip material due to intermittent operation effecting the movement of the strip material. U.S. Pats. 3,208,685 and 3,208,686 each disclose a film cartridge in which such a roller post is used.

It is essential that the roller head of the post be smoothly formed to fulfill its function and so that there will be no injury to the flexible strip nor any interference with its passage over the roller head. It is also essential that the bearing surface of the stem be smoothly formed to fulfill its described function of free rotation of the roller post. It is also necessary that the snap-in element be smoothly formed so that it can be readily inserted through the bearing aperture in a wall structure to assemble the roller post thereon and so that any engagement between it and the wall at the end of the bearing aperture will not hinder free rotation of the post.

In the conventional injection molding technique, a material, such as a thermoplastic, is heated to a flowable state and then forced into one or more cavities of a mold through the sprue, runners, and tunnel gates by means of an injection ram. When the molded material in the cavities has cooled, the resulting molded articles are ejected along with the sprue, runners and tunnel gates which are then separated from the articles by breaking or snapping.

Often a rough surface remains on the articles at the location of this separation. If the rough surface should interfere in any manner with the use of the article, it is then necessary to make the surface smooth by some suitable operation. This operation is time consuming and adds to the cost of production. This separate operation becomes increasingly more difficult, if not impossible, if the size of the article, as in the case of the roller post under consideration, should be less than one inch in length. It is further essential that the snap-in element at the end of the stem remote from the roller head be designed to be flexibly cammed or compressed inwardly of itself by the wall structure bearing aperture as the stem and snap-in element are inserted through the wall structure, and the surfaces of the snap-in element must be smooth to allow ready insertion through the opening. This is all accomplished in accordance with the present invention by molding the roller post in such a manner that the tunnel gates through which the plastic material passes into the mold cavities only goes to the portion of each cavity forming the snap-in element and to that area adjacent the cam-like surface on the snap-in element which is wiped smooth when the roller post is ejected from the mold.

Accordingly, it is the primary object of the present invention to provide a novel method of injection molding an article in such a manner as to eliminate rough surfaces on the article where the sprue, runner and tunnel gate are separated from the molded article.

Another object is to provide an improved method of injection molding a roller post of the type described wherein the thermoplastic is injected into the portion of the mold cavity forming the snap-in element and ejecting the roller post from the mold in such a way that no sprue, runner or tunnel gate is left on the article which must be later removed by a separate operation.

The novel features that I consider characteristic of my invention are set forth with particularity in the appended claims. The invention itself, however, both as to its organization and its mode of operation, together with additional objects and advantages thereof, will best be understood from the following description when read in connection with the accompanying drawings, in which:

FIG. 1 is an elevation view of the roller post of the invention as assembled in the opening of a bearing;

FIG. 2 is a view taken along line 2—2 of FIG. 1, only of the roller post;

FIG. 3 is a perspective view, partially in section, illustrating the roller post in assembled position in the wall of a cartridge construction;

FIG. 4 is an elevation view in cross section of the roller post within the mold and as it is being ejected from one of the mold halves with a portion of the arbor being broken away;

Figure 5:
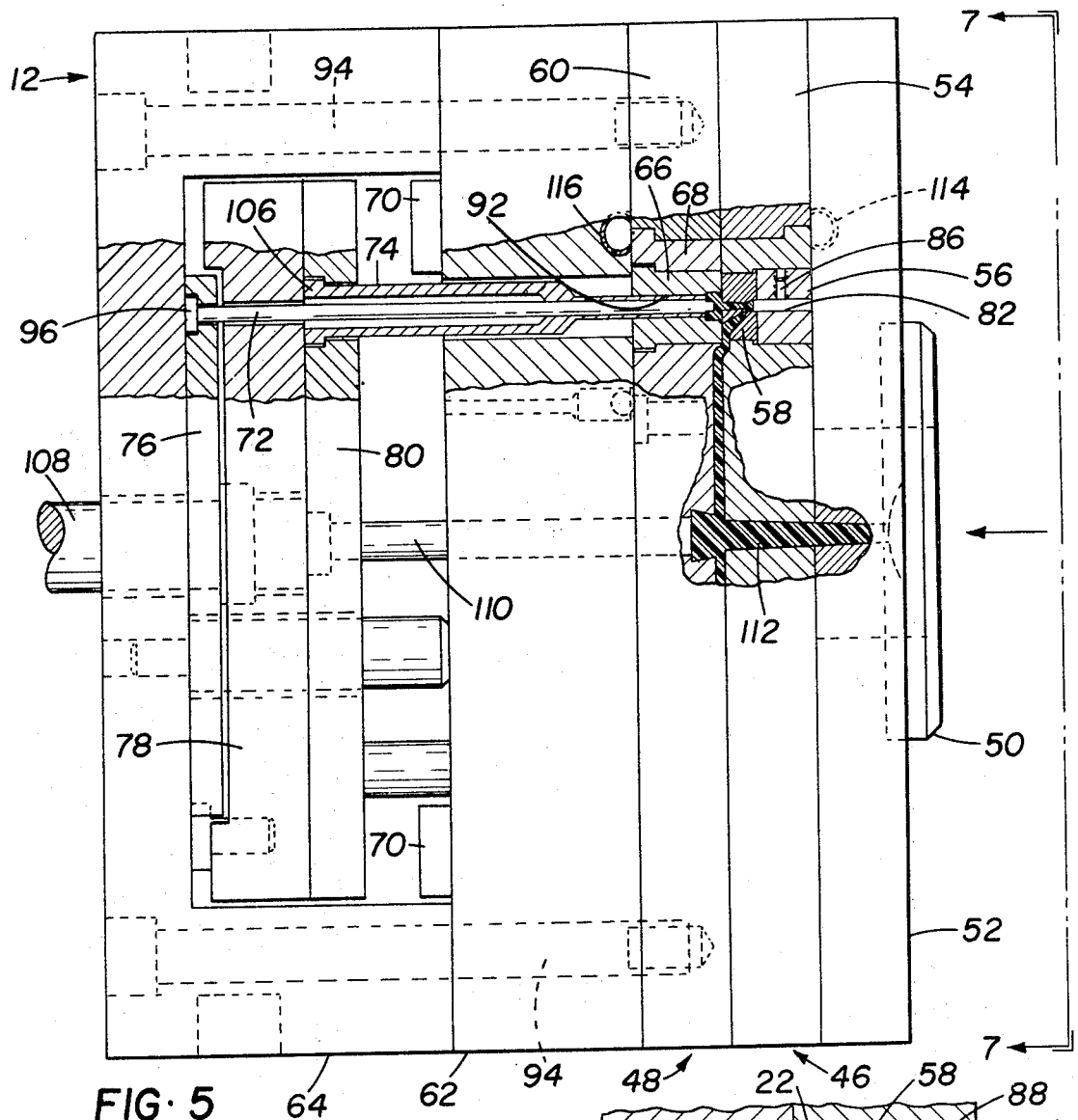
FIG. 5 is an elevational view, partly in cross section, of the mold.
Figure 6:
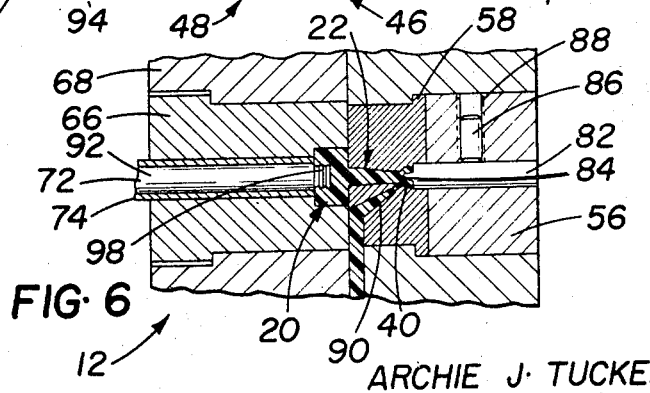
FIG. 6 is an enlargement of a portion of the mold illustrated in FIG. 5 and illustrates the roller post, runner and tunnel gate as they are located within the mold.
Figure 7:
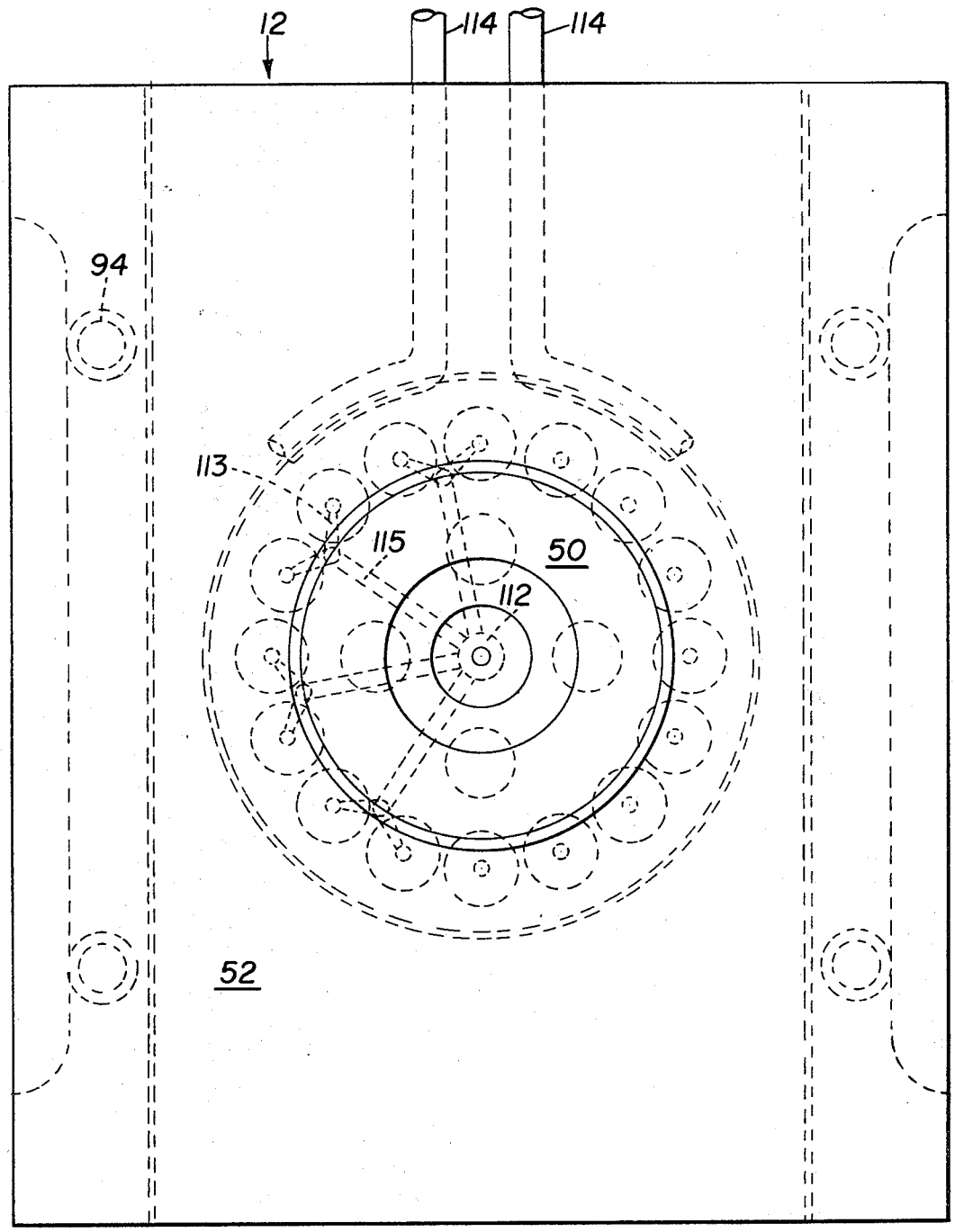
FIG. 7 is a view taken along lines 7—7 of FIG. 5.

Referring to the drawings, a roller post 10 (FIG. 1) is formed in mold 12 (FIGS. 4, 5, 6 and 7), preferably from acetate butyrate. The roller post is arranged for snap-in assembly in the bearing 13 in a wall structure such as the wall 14 of cartridge 16 (FIG. 3), which receives strip material 18. The roller post, as assembled in the cartridge, is freely rotatable to guide and snub the strip material as the material passes thereover.

The roller post 10 has a roller head 20 and a stem 22 integrally connected to the roller head and extending axially from the head.

The roller head 20 has a cylindrical smooth roller surface 24 over which the strip material passes; a cored opening 26 extending coaxially into one end of the roller head; and an annular lip 28 on the end face 30 bordering the opening and forming a roller bearing surface when in engagement with the wall 32 opposite the cartridge wall 14. The purpose of the cored opening 26 will be discussed later.

Stem 22 is inserted into the bearing 13 of the cartridge wall 14; preferably has a pair of bearing surfaces 34, 36 spaced from each other by intermediate portion 38 of the stem, which tapers axially inwardly along its length from bearing surface 34 to bearing surface 36; and the extremity of the stem is provided with a snap-in element 40 which fans out to a diameter greater than the diameter of the stem portion adjacent thereto and which is depressed or cammed inwardly of itself during withdrawal of the stem 22 from the mold 12 (FIG. 4) and for assembly in the cartridge 16 (FIG. 3). The snap-in element may be formed by bifurcating the extremity of the stem to form a pair of fins 42.

The fins 42, being not only of greater diameter than the adjacent stem portion but also of the cartridge wall bearing 13, retain the roller post 10 in assembled position in the cartridge wall bearing and prevent the roller post from being withdrawn from bearing 13 during normal use. Cam-like surfaces 44 are provided on the fins and engage with the inside surface of the bearing 13 as the stem 22 of the roller post is inserted in one end of the bearing so that the fins are depressed or cammed inwardly of themselves until the fins emerge from the opposite end of the bearing 13.

The description of the mold for forming the roller post, and the operation of the mold will now be described. The particular mold illustrated is a multicavity mold capable of forming sixteen roller posts at the same time. The scope of the invention is not to be understood, however, as being limited to how many roller posts can be made at the same time, since many more or fewer posts could be made in accordance with the concepts of this invention as desired.

The mold 12 is in two major parts, a fixed section 46 and a movable section 48. The fixed section is affixed to the stationary portion of the molding apparatus (not shown), and the movable section is affixed to the portion of the molding apparatus (not shown) which reciprocates periodically with the molding operation.

The fixed section includes a clamping ring 50, a right-hand clamp plate 52, and a right-hand force plate 54. The right-hand force plate includes, for each cavity, a back-up block, or pin holder 56 and a stem cavity block 58.

The movable section 48 includes a left-hand force plate 60, a support plate 62, and an ejector housing 64. The left-hand force plate includes, for each cavity, a roller head cavity block 66 and a left-hand force block 68. The support plate 62 has limiting blocks 70 affixed thereto. The ejector housing 64 has operably connected thereto at least one arbor 72 and stripper sleeve 74 for each roller post being formed with each molding operation, and includes an arbor retainer plate 76, an ejector plate 78 and a stripper sleeve retainer plate 80.

Each back-up block or pin holder 56 supports a pin 82 extending axially through this block and partially into the stem cavity block to close one end of the stem cavity. The pin has a wedge 84 which forms the opening between the bifurcated fins 42 of the roller post stem. The pin and the wedge are held in proper position relative to the roller post stem by the set screw 86 which abuts the pin at right angles through a bore 88 made in one side of the backup block or pin holder.

The stem cavity block 58 also contains the cavity for the tunnel gate 90 through which the hot thermoplastic composition is forced into the stem cavity.

In the movable section 48 of the mold 12 one end of each roller head cavity block 66 contains the cavity for the roller head, and a central bore 92 extending through the axis of this block is designed to receive one end of the arbor 72 and stripper sleeve 74 which surrounds the arbor. The latter two elements will be further discussed in the description of the ejector housing 64.

The ejector housing 64 is secured to the support plate 62 and left-hand force plate 60 of the movable mold section 48 by suitable means such as the bolts 94 shown in the drawing. The housing contains the operative parts of the movable mold section for controlling the movement of the stripper sleeve 74 relative to the arbor 72 for ejecting the molded roller post 10.

The arbor 72 is held by its head 96 in the arbor retainer plate 76, the plate being suitably secured at one end to one of the ejector housing. The main body portion of the arbor extends from the ejector housing through the stripper sleeve 74.

A short end section 98 of the arbor, reduced in diameter from the main body portion, projects beyond the end of the stripper sleeve into the roller head cavity to form the cored hole 26 in the molded roller head 20. This short end section aids in providing dimensional stability to the molded roller head, since without the end section a roller head formed entirely and solidly of a thermoplastic composition such as acetate butyrate may shrink or sag along the periphery of its roller surface 24 upon cooling.

This short end section 98 of the arbor 72 also has two continuous grooves 100 formed in the surface around its periphery, and an annular recess 102 is formed in the end face of the main body portion of the arbor adjacent the base of the short end section. When the thermoplastic composition is extruded into the roller head cavity around this end of the arbor, annular rings 104 are formed in the interior wall surface of the cored hole of the roller head 20 by the continuous grooves 100 on the arbor 72, and the annular lip 28 is formed on the end face 30 of the roller head by the annular recess 102 adjacent the base of the short end section. The annular rings 104 are known as "puller rings" and aid in retaining the roller post on the arbor end section 98 during the first part of the ejection operation when the stem 22 and snap-in element 40 are pulled from the stem cavity block 58. During the second part of the ejection operation when the stripper sleeve 74 is operated to eject the roller post 10 from the arbor 72, the molded annular rings 104 are so formed and rounded at their periphery, and the character of the thermoplastic material is such as to permit flexure of the annular rings to release the short end section 98 of the arbor 72 from the roller head 20.

The stripper sleeve 74 is held by its head 106 in the stripper sleeve retainer plate 80. The main body portion of the stripper sleeve extends from the ejector housing and through the support plate 62 and the roller head cavity block 66 to form part of the wall abutting the end face 30 of the roller head 20. The stripper sleeve extends around and along a substantial length of the arbor 72, and the arbor, the support plate 62 and the left-hand force block 68 are reciprocally movable relative to the stripper sleeve 74 for the purpose of ejecting the molded roller post 10 from the roller head cavity and the short end section 98 of the arbor.

The ejector housing 64 and arbor retainer plate 76 are moved relative to the ejector plate 78 and the stripper sleeve retainer plate 80 when the knock-out bar 108, which is connected to the ejector plate, comes into engagement with a fixed portion (not shown) on the molding apparatus. As the mold section 48 continues to move, the ejector housing 64 and arbor retainer plate 76 move relative to the ejector plate 78 and stripper sleeve retainer plate 80 until the limiting blocks 70 which are affixed to the support plate 62 abut the stripper sleeve retainer plate. The resulting relative movement between the stripper sleeve and the arbor forces the roller post 10 off the arbor and out of the roller head cavity for ejection from the molding apparatus.

A knock-out pin 110 centrally located in the movable mold section 48 along its axis is secured in the stripper sleeve retainer plate 80. The relative movement between the pin 110 on the one hand and the support plate 62 and left-hand force block 68 on the other hand ejects the sprue portion 112, tunnel gate portion 113, and runner portion 115 of the multiple roller posts being molded with each molding operation.

Cooling tubes 114 and 116 carrying a suitable coolant such as water are provided in the fixed section 46 and the movable section 48 of the mold 12 to cool the area adjacent the molded roller post 10 to facilitate speed of ejection. The cooling tubes 114 in the fixed section are located in the right-hand clamping plate 52, and the cooling tubes in the movable section are located in the support plate 62.

The molding operation is as follows:

The movable section 48 of the mold 12 is moved by the molding apparatus (not shown) into engagement with the fixed section 46 of the mold so that the roller head cavity 118 and stem cavity 120 (FIG. 4) are in axial alignment. The thermoplastic composition is forced through the sprue 112 into the tunnel gate 90 and into the two aligned cavities through one of the bifurcated fin areas of the stem cavity. Fluid passes through the cooling tubes 114, 116 to dissipate the heat from the area around the cavities so that the molded roller post 10 will be sufficiently hardened to withstand subsequent ejection operations.

The movable mold section 48 is moved away from the fixed section 46 pulling the stem portion of the roller post out of the stem cavity block 58 in the fixed section 46 of the mold 12. The birfurcated fins 42 of the roller post 10 are pulled through an opening 122 (FIG. 4) in the stem cavity block of smaller diameter than the diameter of the fins.

The movable mold section 48 continues on its backward reciprocation carrying with it the arbor 72 and stripper sleeve 74, and as the knock-out bar 108 comes into abutment with a fixed portion (not shown) of the molding apparatus, the ejector plate 78 and stripper sleeve retainer plate 80 are constrained against further movement while the remaining structure of the movable mold section continues to move causing the ejection of the roller head 20 until the limiting blocks 70 abut the face of the stripper sleeve retainer plate. The stripper sleeve 74 forces the roller head away from the end section 98 of the arbor 72 within the cored opening 26 of the roller head.

At the same time of the relative movement of the stripper sleeve the sprue knock-out pin 110 is held stationary by the constrained stripper sleeve retainer plate 80 so that as the remainder of the movable mold section 48 continues its leftward movement the sprue 112 is forced out of the end of the movable mold section.

It will now be recognized from the foregoing description that some of the benefits of this method of molding the roller post over other possible methods are the ultimate simplicity of design of the mold, and the assurance that the roller head has a smooth roller surface over which the flexible strip material may pass without injury or obstruction. The roller post itself may be readily assembled in the bearing of a wall structure, yet will be retained in the bearing for its normal intended use.

Although the foregoing description relates to a specific embodiment of the invention, it is obvious that variations and modifications thereof can be effected within the spirit and scope of the invention. Accordingly, the present disclosure is to be considered as illustrative and not as limiting the scope of the invention which is defined by the following claims.

I claim:

1. The method of molding a roller post having a stem, a roller head on one end of said stem and a compressible snap-in element having a cam-like surface on the other end of said stem, said stem having a cross section smaller than the adjacent portion of the snap-in element, using a two-plate injection molding apparatus comprising a first plate having an open-ended mold cavity for defining the roller head and a second plate having a second open-ended mold cavity for defining the stem and snap-in element, said second plate having a tunnel gate which opens into the portion of the second open-ended cavity which defines a portion of the cam-like surface of said snap-in element adjacent to the stem, the method comprising:

moving the two plates together to bring the open ends of said mold cavities into alignment and form a closed cavity for defining the roller post;

injecting a hardenable molding composition through the tunnel gate and the portion of the second open-ended cavity which defines a portion of the cam-like surface of said snap-in element to fill the closed cavity and form the roller post; and after hardening of the composition, separating said plates while holding the roller head on said roller post within its cavity in said first plate to pull the snap-in element through that portion of the second cavity which defines the relatively smaller cross section of the stem and wipe the cam-like surface of the snap-in element.

2. The method of molding a roller post as defined in claim 1, and during subsequent separating movement of said plates, releasing said roller head from its cavity.

3. The method of molding a roller post as defined in claim 4, including the step of driving the roller head from its cavity during the final separating movement of said plates and after the stem and snap-in element have been removed from said second cavity.

4. The method of molding a roller post having a substantially cylindrical stem, a substantially cylindrical roller head on one end of said stem, and a bifurcated compressible snap-in element having a cam-like surface on the other end of said stem and having a diameter adjacent to said other end which is larger than that of said other end, in a two-plate injection molding apparatus wherein one plate includes an open-ended cavity for defining the roller head and the other plate includes a second open-ended cavity for defining the stem and snap-in element and the cam-like surface, the portion of said second cavity which defines said other end of the stem having a smaller diameter than the adjacent portion which defines the snap-in element and the cam-like surface, said other plate having a tunnel gate which opens into said adjacent portion of said second cavity, which defines said cam-like surface, the method comprising the steps of:

moving the two plates together to bring the open ends of said mold cavities into alignment and form a closed cavity corresponding in shape to the roller post;

injecting a hardenable molding composition through the tunnel gate and adjacent portion of said second cavity which defines the snap-in element and said cam-like surface to fill the closed cavity and form the roller post; and after hardening of the composition, separating said plates while holding the roller head within its cavity so that during the initial separating movement of said plates, the stem and snap-in element are pulled axially from the second cavity to first separate the hardened molding composition in the tunnel gate from the snap-in element and to wipe the cam-like surface of said snap-in element on said portion of the other cavity which defines said other end of the stem.

References Cited

UNITED STATES PATENTS

| | | | |
|---|---|---|---|
| 2,402,287 | 6/1946 | Kearns | 264—334 X |
| 2,408,629 | 10/1946 | Green | 264—329 |
| 2,583,441 | 1/1952 | Palmer | 264—318 X |
| 2,789,311 | 4/1957 | Holt | 264—318 |
| 3,031,722 | 5/1962 | Gits | 264—161 X |
| 3,058,163 | 10/1962 | Kranc et al. | |
| 3,196,483 | 7/1965 | Eyles | 264—161 X |
| 3,202,749 | 8/1965 | White | 264—328 X |
| 3,362,675 | 1/1968 | Ferdig | 264—318 X |
| 3,013,308 | 12/1961 | Armour | 264—318 |

FOREIGN PATENTS

| | | |
|---|---|---|
| 757,259 | 9/1956 | Great Britain. |

OTHER REFERENCES

Glanvill and Denton: "Injection-Mould Design Fundamentals," p. 98, copyright 1965.

ROBERT F. WHITE, Primary Examiner

R. R. KUCIA, Assistant Examiner

U.S. Cl. X.R.

264—318, 328

PO-1050
(5/69)

UNITED STATES PATENT OFFICE
CERTIFICATE OF CORRECTION

Patent No. 3,523,991      Dated August 11, 1970

Inventor(s) Archie J. Tucker

It is certified that error appears in the above-identified patent and that said Letters Patent are hereby corrected as shown below:

Column 6, line 42, change "3" to -- 4 --; line 43 change "4" to -- 3 --; and line 47, change "4" to -- 3 --.

SIGNED AND
SEALED
DEC 29 1970

December 29, 1970

(SEAL)
Attest:

Edward M. Fletcher, Jr.
Attesting Officer

WILLIAM E. SCHUYLER, JR.
Commissioner of Patents